(12) United States Patent
Babbush

(10) Patent No.: US 12,147,492 B2
(45) Date of Patent: Nov. 19, 2024

(54) OPERATOR AVERAGING WITHIN QUANTUM COMPUTING SYSTEMS

(71) Applicant: Google LLC, Mountain View, CA (US)

(72) Inventor: Ryan Babbush, Venice, CA (US)

(73) Assignee: Google LLC, Mountain View, CA (US)

( * ) Notice: Subject to any disclaimer, the term of this patent is extended or adjusted under 35 U.S.C. 154(b) by 85 days.

(21) Appl. No.: 18/049,207

(22) Filed: Oct. 24, 2022

(65) Prior Publication Data

US 2023/0315808 A1 Oct. 5, 2023

Related U.S. Application Data

(63) Continuation of application No. 16/603,964, filed as application No. PCT/US2017/067095 on Dec. 18, 2017, now Pat. No. 11,494,466.

(60) Provisional application No. 62/506,319, filed on May 15, 2017.

(51) Int. Cl.
*G06F 17/18* (2006.01)
*G06N 10/00* (2022.01)

(52) U.S. Cl.
CPC .............. *G06F 17/18* (2013.01); *G06N 10/00* (2019.01)

(58) Field of Classification Search
CPC ........ G06N 10/00; G06N 10/20; G06N 10/40; G06N 10/60; G06N 10/80; G06F 17/16–18
See application file for complete search history.

(56) References Cited

U.S. PATENT DOCUMENTS 7,533,068 B2 * 5/2009 Maassen van den Brink ............. G06F 15/76
706/14
2016/0283857 A1 9/2016 Babbush et al.
2018/0053112 A1 2/2018 Bravyi et al.
2018/0096085 A1 4/2018 Rubin

FOREIGN PATENT DOCUMENTS

CN 106031041 A 10/2016
CN 106650193 A 5/2017
JP 2008-539480 11/2008
JP 2013-114366 6/2013
(Continued)

OTHER PUBLICATIONS

S. Modi et al., Nonadiabatic quasiparticle approach for rotation-particle coupling in triaxial odd-A nuclei, Physical Review C95, 024326, Feb. 27, 2017 (Year: 2017).*

(Continued)

*Primary Examiner* — Emily E Larocque
(74) *Attorney, Agent, or Firm* — Fish & Richardson P.C.

(57) ABSTRACT

Methods, systems and apparatus for estimating an expectation value of a quantum mechanical observable. In one aspect, a method includes identifying a first operator associated with the observable, wherein the first operator comprises a linear combination of terms. One or more constraints on expectation values of one or more of the terms in the linear combination are determined. A second operator is defined, wherein the second operator comprises a combination of the first operator and one or more of the determined constraints. The expectation value of the quantum mechanical observable is estimated using the second operator.

18 Claims, 4 Drawing Sheets

(56) References Cited

FOREIGN PATENT DOCUMENTS

| JP | 2017-073106 | 4/2017 |
|----|-------------|--------|
| JP | 2019531008 A | 10/2019 |
| WO | WO 2016044917 | 3/2016 |
| WO | WO 2018212789 | 11/2018 |

OTHER PUBLICATIONS

Y-R Zhang et al., Quantifying coherence in infinite-dimensional systems, Physical Review A 93, 012334, 2016 (Year: 2016).*
Office Action in European Appln. No. 17829444.3, dated Apr. 19, 2023, 11 pages.
AU Office Action in Australian Application No. 2017414716, dated Jun. 17, 2020, 3 pages.
AU Office Action in Australian Application No. 2017414716, dated May 15, 2020, 4 pages.
CA Office Action in Canadian Application No. 3,060,786, dated Dec. 9, 2020, 5 pages.
CA Office Action in Canadian Application No. 3,060,786, dated Nov. 30, 2021, 3 pages.
EP Office Action in European Application No. 17829444.3, dated Jun. 17, 2021, 9 pages.
G.G. Guerreschi et al., Practical optimization for hybrid quantum-classical algorithms, arXiv:1701.01450v1 [quant-ph], Jan. 5, 2017 (Year: 2017).
International Preliminary Report on Patentability in International Application No. PCT/US2017/067095, dated Nov. 19, 2019, 12 pages.
International Search Report and Written Opinion in International Application No. PCT/US2017/067095, dated Apr. 6, 2018, 17 pages.
JP Office Action in Japanese Application No. 2019-563209, dated Jan. 25, 2021, 9 pages (with English translation).
JP Office Action in Japanese Appln. No. 2021-119639, dated Aug. 8, 2022, 13 pages (with English Translation).
Mazziotti, "Pure-n-representability conditions of two-fermion reduced density matrices" Physical Review, Sep. 2016, 5 pages.
McClean et al, "Exploiting locality in quantum computation for quantum chemistry" arXiv, Jul. 2014, 14 pages.
McClean et al, "Hybrid quantum-classical hierarchy for mitigation of decoherence and determination of excited states" Physical Review, Apr. 2017, 10 pages.
McClean et al, "The theory of variational hybrid quantum-classical algorithms" New Journal of Physics, Feb. 2016, 5 pages.
N. C. Rubin, A Hybrid Classical/Quantum Approach for Large-Scale Studies of Quantum Systems with Density Matrix Embedding Theory, arXiv:1610.06910v2 [quant-ph], 2016 (Year: 2016).
Office Action in Chinese Appln. No. 201780090868.7, dated Sep. 23, 2022, 21 pages (with English Translation).
Shenvi et al, "Expectation value constraints for the N-representability problem" Physical Review, Aug. 2006, 12 pages.
Notice of Allowance in Chinese Appln. No. 201780090868.7, mailed on Aug. 31, 2023, 7 pages (with English translation).
Notice of Allowance in Japanese Appln. No. 2023-065092, mailed on Jul. 29, 2024, 5 pages (with English translation).

* cited by examiner

OPERATOR AVERAGING WITHIN QUANTUM COMPUTING SYSTEMS

CROSS-REFERENCE TO RELATED APPLICATION

This application is a continuation application of, and claims priority to, U.S. patent application Ser. No. 16/603,964, filed on Oct. 9, 2019, which application is a National Stage Application under 35 U.S.C. § 371 and claims the benefit of International Application No. PCT/US2017/067095, filed Dec. 18, 2017, which claims priority to U.S. Application No. 62/506,319, filed May 15, 2017, the disclosures of each are incorporated herein by reference.

BACKGROUND

This specification relates to quantum computing.

Quantum algorithms are algorithms that run on realistic models of quantum computation, for example a quantum circuit model of computation. A classical algorithm is a step by step procedure for solving a task, where each step is performed by a classical computer. Similarly, a quantum algorithm is a step by step procedure for solving a task, where each step is performed by a quantum computer.

SUMMARY

This specification describes technologies for reducing the number of state preparation and measurement repetitions to perform operator averaging within a quantum or classical-quantum algorithm.

In general, one innovative aspect of the subject matter described in this specification can be implemented in a method performed by one or more quantum devices and one or more classical processors for estimating an expectation value of a quantum mechanical observable, the method including: identifying a first operator associated with the observable, wherein the first operator comprises a linear combination of terms; determining, based on the first operator, one or more constraints on expectation values of one or more of the terms in the linear combination; defining a second operator, wherein the second operator comprises a combination of the first operator and one or more of the determined constraints; and estimating the expectation value of the quantum mechanical observable using the second operator.

Other implementations of this aspect include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations estimating the expectation value of the quantum mechanical observable using the second operator comprises: preparing an initial state of a quantum system included in the one or more quantum devices; performing, by the one or more quantum devices, multiple measurements of the second operator on multiple independent copies of the initial quantum state; and processing, by the one or more classical processors, results of the multiple measurements to estimate the expectation value of the quantum mechanical observable.

In some implementations the number of measurements required to estimate the expectation value of the observable using the second operator to target precision is less than the number of measurements required to estimate the expectation value of the operator using the first operator to target precision.

In some implementations the method further comprises simulating the quantum system using the estimated expectation value.

In some implementations the first operator is given by $$H = \sum_\gamma w_\gamma H_\gamma$$

where $w_\gamma$ represent scalar coefficients and $H_\gamma$ represent 1-sparse self-inverse operators that act on qubits.

In some implementations the 1-sparse self-inverse operators that act on qubits comprise strings of Pauli operators.

In some implementations estimating the expectation value of the observable using the first operator comprises performing $(\Sigma_\gamma |w_\gamma|/\epsilon)^2$ measurements, where E represents a predetermined precision.

In some implementations the one or more constraints comprise equality constraints.

In some implementations the expectation value of each of the one or more constraints is equal to zero.

In some implementations the second operator is given by $$H' = H + \sum_k a_k C_k$$

where $a_k$ represent scalar coefficients and $C_k$ represents the determined constraints.

In some implementations determining the expectation value of the observable using the second operator comprises performing $(\Sigma_\gamma |w_\gamma + \Sigma_k a_k c_{\{k,\gamma\}}|/\epsilon)^2$ measurements, where E represents a predetermined precision.

In some implementations the method further comprises representing the first operator as a vector; representing the determined constraints as a matrix; defining, based on the vector and matrix, a convex optimization task; and solving the convex optimization task to determine a number of measurements required to determine the expectation value of the observable using the second operator.

In some implementations the method further comprises adding an additional constraint that cancels the identity term to the one or more constraints.

In some implementations the method further comprises determining that the second operator is not Hermitian; and restoring hermiticity to the second operator.

In some implementations restoring hermiticity to the second operator comprises creating a new operator that is isospectral to the first operator in the n electron manifold, wherein the number of measurements required to reliably estimate the observable associated with the new operator scales as the number of measurements required to reliably estimate the observable associated with the second operator.

In some implementations the first operator comprises a first Hamiltonian and the second operator comprises a second Hamiltonian.

In some implementations the constraints comprise one or more of (i) equality constraints, or (ii) inequality constraints.

In some implementations the constraints comprise pure state constraints, wherein pure state constraints comprise constraints that cause measured quantum states of the quantum system to map from a decohered quantum state to a nearest pure quantum state.

In some implementations the second operator comprises a linear combination of terms, and wherein determining an expectation value of the observable using the second operator comprises measuring diagonal terms of the second operator in parallel.

The subject matter described in this specification can be implemented in particular ways so as to realize one or more of the following advantages.

Commonly, for chemical accuracy, tens of millions of experimental repetitions of state preparation and measurement of all qubits are required to estimate the expectation value of an operator to target precision. By applying the techniques described in this specification, the required number of experimental repetitions of state preparation and measurement is reduced. Therefore, a system implementing operator averaging as described in this specification as part of a quantum or classical-quantum algorithm may achieve more efficient computation time. In addition, by reducing the number of experimental repetitions of state preparation and measurement required, a system implementing operator averaging as described in this specification as part of a quantum or classical-quantum algorithm may require less computational resources and improve the costs associated with performing the quantum or classical-quantum algorithm.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
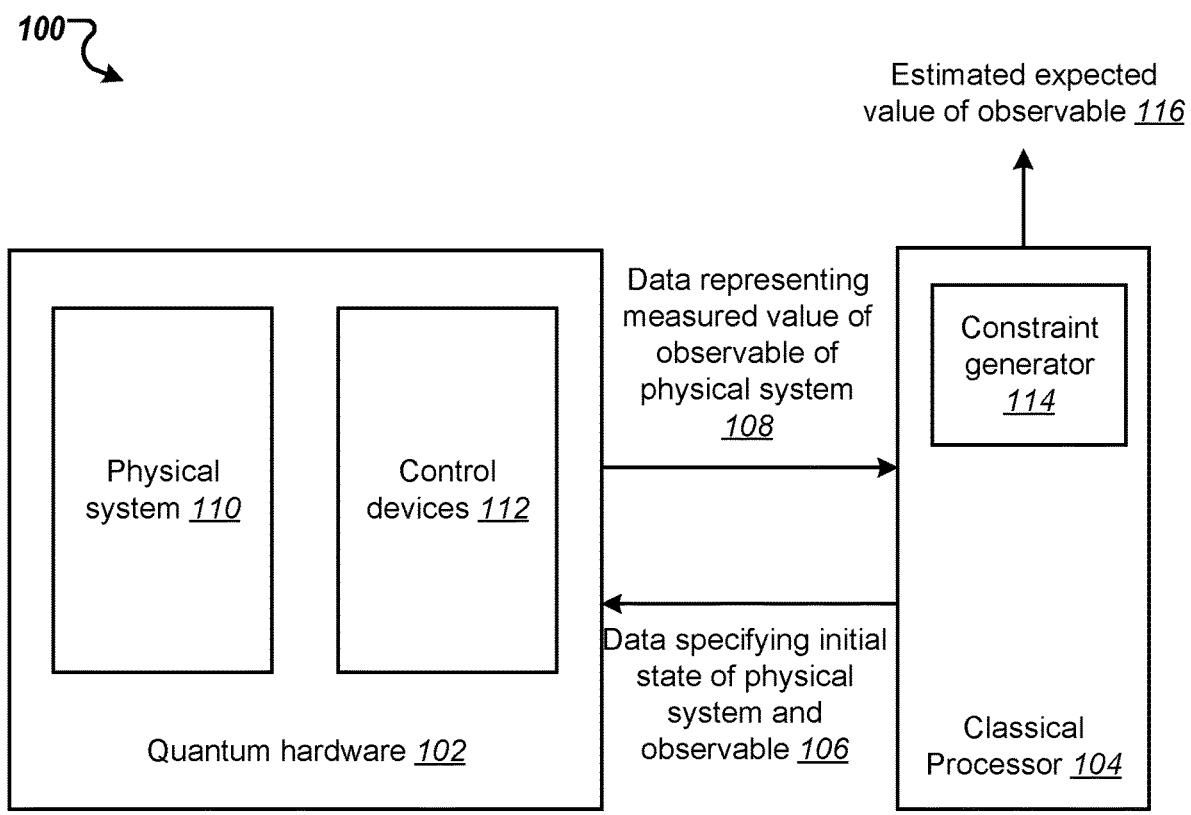
FIG. 1 depicts an example quantum computing system.

Many hybrid quantum-classical algorithms include one or more operator averaging steps where the expectation value of an operator corresponding to a quantum mechanical observable is estimated by repeated state preparation and measurement to aggregate probabilities of computational basis states. For example, the variational quantum eigensolver (VQE) is a quantum-classical algorithm that may be used in quantum simulations to estimate energies, e.g., a ground state energy, of a quantum system. The VQE algorithm includes a quantum subroutine that includes preparing a quantum state using a set of variational parameters and performing measurements on the state using a Pauli operator decomposition of the Hamiltonian to determine an energy expectation value of the quantum system. Since determining the energy expectation value (an example operator averaging process) occurs for every term in the Hamiltonian at every step of the quantum subroutine, this step of the VQE algorithm can be rate limiting. The number of measurements required by the subroutine can be reduced by grouping Hamiltonian terms into commuting groups and dropping Hamiltonian terms with small coefficients, however such procedures do not change the overall scaling of the number of terms that need to be measured to estimate the energy expectation value.

Other example quantum-classical algorithms that include operator averaging steps include the quantum approximate optimization algorithm (QAOA) for solving combinatorial optimization tasks.

This specification describes methods and systems for estimating expectation values of operators (also referred to as operator averaging herein) using structures present in quantum systems or operators of quantum systems. Structures are used to constrain values that the expectation values can take. For example, expectation values of a Hamiltonian H that describes a fermionic quantum system define a 2-particle reduced density matrix (2-RDM). Such fermionic quantum systems have multiple constraints. For example, a 2-RDM must be positive semi-definite, have a certain trace, a certain rank, and must be Hermitian. Other constraints result from the anti-symmetry of fermions. Such constraints are a result of fundamental principles of quantum mechanics and restrict the values that the expectation values can take. Information relating to constraints is leveraged by the system in order to reduce the number of measurements needed to estimate expectation values of operators, improving the computational efficiency of the system.

As a toy example, suppose a quantum system is described by the Hamiltonian given below in equation (1).

$$H_{example} = \Sigma_\gamma w_\gamma H_\gamma = 3.0 * X_1 X_2 + 2.0 * Y_3 Y_7 - 1.7 * X_1 X_7 \qquad (1)$$

In equation (1), expectation values of the Pauli operators $X_1$, $X_2$, $Y_3$ and $Y_7$ may be restricted according to the constraint given in equation (2) below.

$$\langle X_1 X_2 \rangle + \leq Y_3 Y_7 \rangle = 1 \qquad (2)$$

This constraint could be a result of energy conservation or momentum conservation laws, and is dependent on the corresponding Hamiltonian describing the quantum system. In order to measure $\langle H_{example} \rangle$, the system may utilize information in the constraint (2). For example, the system may determine that $\langle X_1 X_2 \rangle = 1 - \langle Y_3 Y_7 \rangle$, and in response thereto determine that only one of the quantities $\langle X_1 X_2 \rangle$ or $\langle Y_3 Y_7 \rangle$ needs to be measured to estimate the energy expectation value $\langle H_{example} \rangle = 3.0 * \langle X_1 X_2 \rangle + 2.0 * \langle Y_3 Y_7 \geq -1.7 * \langle X_1 Y_7 \geq = 3.0 * (1 - \langle Y_3 Y_7 \geq) + 2.0 * \langle Y_3 Y_7 \rangle - 1.7 * \langle X_1 Y_7 \rangle$, reducing the number of measurements needed to determine $\langle H_{example} \rangle$.

FIG. 1 depicts an example quantum computing system 100 for estimating the expectation value of a quantum mechanical observable. The example system 100 is an example of a system implemented as classical or quantum computer programs on one or more classical computers or quantum computing devices in one or more locations, in which the systems, components, and techniques described below can be implemented.

The system 100 includes quantum hardware 102 in data communication with a classical processor 104. The system 100 may be configured to perform classical computations in combination with quantum computations using quantum hardware 102 and classical processors 104. For example, the system 100 may be configured to perform hybrid quantum-classical algorithms, e.g., algorithms wherein a quantum subroutine is run inside a classical computation. Example hybrid quantum-classical algorithms that the system 100 may be configured to perform include variational quantum eigensolver (VQE) algorithms or quantum approximate optimization algorithms (QAOA).

The quantum hardware 102 includes components for performing quantum computations. For example, the quantum hardware 102 may include a physical system 110. The physical system 110 includes one or more multi-level quantum subsystems, e.g., qubits or qudits. In some implementations the multi-level quantum subsystems may be superconducting qubits, e.g., Gmon qubits. The type of multi-level quantum subsystems that the system 100 utilizes is dependent on the physical system of interest. For example, in some cases it may be convenient to include one or more resonators attached to one or more superconducting qubits, e.g., Gmon or Xmon qubits. In other cases ion traps, photonic devices or superconducting cavities (with which states may be prepared without requiring qubits) may be used. Further examples of realizations of multi-level quantum subsystems include fluxmon qubits, silicon quantum dots or phosphorus impurity qubits. In some cases the multi-level quantum subsystems may be a part of a quantum circuit.

The quantum hardware 102 may include one or more control devices 112, e.g., one or more quantum logic gates, that operate on the physical system 110. The one or more control devices 112 may further include measurement devices, e.g., readout resonators, that are configured to measure operators, e.g., a Hamiltonian, associated with the physical system 110 and send measurement results to the classical processors 104.

The classical processor 104 includes components for performing classical computations. The classical processor 104 may be configured to generate data specifying an initial state of the physical system 110 and a corresponding quantum mechanical observable of interest, and to transmit the generated data to the quantum hardware 102. For example, as part of an improved process for estimating an expectation value of a quantum mechanical observable, as described below with reference to FIGS. 2 and 3, the classical processor 104 may be configured to identify a first operator, e.g., a Hamiltonian, associated with the quantum mechanical observable. The classical processor 104 may be further configured to determine, based on the defined first operator, one or more constraints on expectation values of one or more of the terms in the linear combination using the constraint generation module 114. For example, in cases where the physical system 110 includes multiple interacting particles, the classical processor 104 may analyze a Hamiltonian describing the system of interacting particles to determine interactions or relationships between some or all of the particles. Such interactions or relationships may be used to identify physical constraints on expectation values of terms of the Hamiltonian. Other constraints may be based on other energy conservation laws, or on momentum conservation laws, as described in more detail below with reference to FIG. 2.

The classical processor may be configured to defining a second operator that is a combination of the first operator and one or more of the determined constraints, and provide data specifying the second operator to the quantum hardware 102. In response to receiving a set of measurements of the observable based on the second operator, the classical processors 104 may estimate an expectation value of the observable. An example process for estimating the expectation value of a quantum mechanical observable in a quantum state of a quantum system using a quantum computing system such as example quantum computing system 100 is described in detail below with reference to FIG. 2.

In some implementations the classical processors 104 may be further configured to perform other classical computational tasks, such as solving convex optimization tasks using simplex methods.

The system 100 may be used to model or simulate a physical system of interest, e.g., a material such as a polymer, devices such as solar cells, batteries, catalytic converts or thin film electronics, or systems exhibiting high temperature superconductivity. In these implementations the system 100 may be configured to estimate an expectation value of a quantum mechanical observable, e.g., an energy expectation value, of the physical system of interest. For example, during the simulation the quantum hardware 102 may receive input data specifying an initial state of the physical system of interest and the observable of interest, e.g., input data 106. The quantum hardware 102 may repeatedly prepare the specified initial state and measure the observable to generate output data representing a set of measured values of the observable, e.g., output data 108. The generated output data may be provided to the classical processor 104 for processing. For example, the classical processor 104 may generate data representing an estimated expected value of the observable using the set of measured values, e.g., output data 116.

In some implementations the estimated expected value of the observable may be further processed or analyzed as part of a computation being performed by the system 100. For example, in cases where the physical system is a material, e.g., a metal or polymer, the generated output data may be used by the classical processors 104 to determine properties of the material, e.g., its conductivity.

Figure 2:
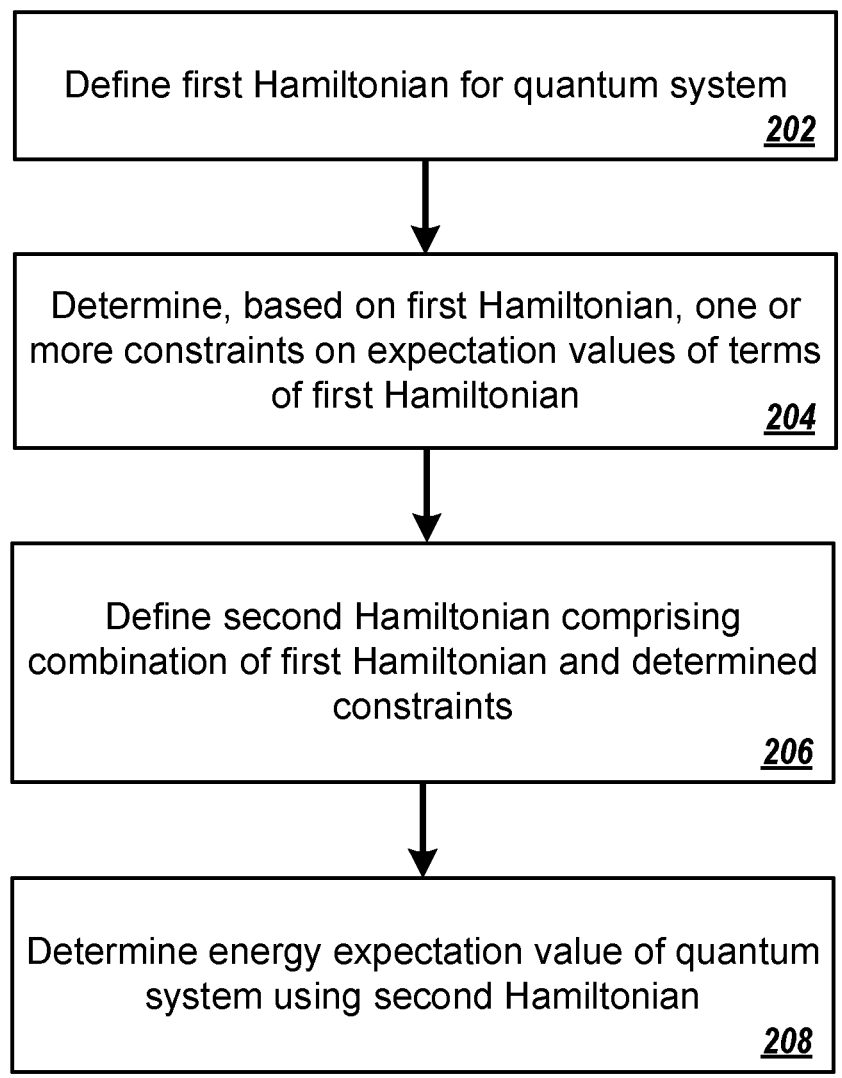
FIG. 2 is a flow diagram of an example process for estimating the expectation value of a quantum mechanical observable.

FIG. 2 is a flow diagram of an example process 200 for estimating the expectation value of a quantum mechanical observable. For convenience, the process 200 will be described as being performed by a system of one or more classical or quantum computing devices located in one or more locations. For example, a quantum computation system, e.g., the system 100 of FIG. 1 appropriately programmed in accordance with this specification, can perform the process 200.

The system identifies a first operator associated with the quantum mechanical observable (step 202). The first operator may be any L-sparse Hermitian operator on a Hilbert space given by equation (3) below.

$$H = \sum_{l=1}^{L-1} w_l H_l \quad (3)$$

In equation (3), $w_l$ may represent real scalar coefficients and $H_l$ may represent 1-sparse self-inverse operators which act on qubits, e.g., strings of Pauli operators $X_i$, $Y_i$, $Z_i$ where i indicates the qubit on which the operator operates on, with $H_l^2 = \mathbb{I}$. For example, the process 200 may be used to estimate an energy expectation value of a quantum system.

In this example the system may identify a first Hamiltonian that describes the quantum system (step 202).

The expectation value of the identified first operator may be estimated by performing M measurements on M independent copies of an initial quantum state $|\psi\rangle$, where the type of measurement performed is dependent on the quantum mechanical observable. For example, the energy expectation value of a quantum system may be estimated by performing M measurements of the Hamiltonian describing the quantum system. Typically, the total number of measurements M required in order to obtain an expectation value of an operator scales as $$M = \sum_{l=0}^{L} M_l \leq \left(\frac{1}{\epsilon}\sum_{l=1}^{L}|w_l|\right)^2 = \frac{\Lambda^2}{\epsilon^2} \quad (4)$$

with $\epsilon$ representing the target precision and $w_l$ defined above with reference to equation (3).

The system determines one or more constraints on expectation values of the first operator (step 204). For example, the system may determine one or more constraints on expectation values of one or more of the terms in the linear combination of operators given by equation (3) above. Determining one or more constraints on expectation values of the first operator may include analyzing the first operator, e.g., the structure of the first operator, to determine properties of the first operator. Determined properties may be used to identify physical constraints on expectation values of terms of the operator.

For example, in cases where the process 200 is used to estimate the energy expectation of a system of interacting particles, the system may analyze a Hamiltonian describing the system of interacting particles to determine interactions or relationships between some or all of the particles. Such interactions or relationships may be used to identify physical constraints on expectation values of terms of the Hamiltonian. For example, if it is determined that a first particle has a first spin, then a corresponding second particle may have a second spin that is opposite to the first spin. This property of spins may be used to determine a corresponding constraint for the first and second particle, e.g., a constraint indicating that the energy expectation value of a subsystem including the first and second particle is equal to a conservation constant. Other constraints may be based on other energy conservation laws, or on momentum conservation laws.

In some implementations the constraints may include equality constraints. In other implementations the constraints may include inequality constraints, or a combination of both equality and inequality constraints. In implementations where the constraints include equality constraints, the constraints may be written as a sum of expectation values that equals zero, e.g., the expectation value of each constraint may be equal to zero. For example, assuming a list of K equality constraints, the k-th constraint $C_k$ may be given by equation (5) below.

$$C_k = \sum_{l=0}^{L-1} c_{k,l}\langle H_l\rangle = 0 \quad (5)$$

In equation (5), $c_{k,l}$ represent real scalar coefficients. In some implementations equality constraints given by equation (5) may include one or more constant terms, e.g., $H_0 = \mathbb{1}$, that ensure the equality sums to zero.

Such constraints provide the system with extra information, e.g., about relationships between expectation values, which can be used to reduce the number of measurements M required in order to obtain an estimation of the corresponding observable. For example, the system may add the constraints $C_k$ to the operator identified at step 202 in order to minimize the number of measurements M.

More specifically, the system defines a second operator (step 206). The second operator includes a combination of the first operator and one or more of the determined constraints $C_k$. Continuing the example above with reference to equation (3), the second operator may be given by equation (6) below.

$$H' = H + \sum_{k=0}^{K-1} \beta_k C_k = \sum_{l=0}^{L-1}\left(w_l + \sum_{k=0}^{K-1}\beta_k c_{k,l}\right)H_l, \quad (6)$$

In equation (6), $\langle H\langle=\rangle H'\rangle$ for all $\beta_k$, where $\beta_k$ represent real scalar coefficients. This relation follows from the observation that $C_k=0$ for N-representable states due to the definition given above in equation (6).

In some implementations the second operator may not be Hermitian. For example, the constraints $C_k$ may either be Hermitian or anti-Hermitian operators. In particular, the constraints may take the form of constraining anti-Hermitian components of a density matrix describing the quantum system to be zero (thus those constraints $C_k$ are themselves anti-Hermitian operators). Therefore, the second operator may not be Hermitian. In these implementations, the system may restore Hermiticity to the second operator without changing the scale of the number of measurements required to reliably estimate the observable associated with the second operator by creating a new operator $H^*=(H'+(H')^\dagger)/2$. The new operator is isospectral to the first operator in the n-electron manifold and the number of measurements required to reliably estimate the observable associated with the new operator scales as the number of measurements required to reliably estimate the observable associated with the second operator.

The system estimates the observable associated with the second operator (step 208). In some implementations the number of measurements required to estimate the observable associated with the second operator is less than the number of measurements required to estimate the observable associated with the first operator. For example, as described above, in some cases the constraints may satisfy equation (7) below.

$$\langle C_k\rangle = \sum_{l=0}^{L-1} c_{\{k,l\}}\langle H_l\rangle = 0 \quad (7)$$

In equation (7) $c_{\{k,l\}}$ is the coefficient of the expectation value of $H_y$ in the constraint $C_k$. Since $\langle C_k\rangle=0$, the expected value of the second operator H' may be given by equation (8) below, due to linearity of the expectation value.

$$\langle H'\rangle = \langle H\rangle + \sum_{k=0}^{K-1}\beta_k\langle C_k\rangle = \langle H\rangle \quad (8)$$

Therefore, to measure the observable associated with the first operator, the system may instead measure the observable associated with the second operator. For example, determining an energy expectation value of a quantum system using the first Hamiltonian defined by equation (3) above may include performing a number of measurements M that scales as $(\Sigma_\gamma |w_\gamma|/\epsilon)^2$, where $\epsilon$ represents a predetermined precision. However, determining the energy expectation value of the quantum system using the second Hamiltonian defined by equation (6) above includes performing a number of measurements M' that is less than M and that scales as $$M' = \left(\frac{1}{\epsilon}\sum_{l=1}^{L}\left(w_l + \sum_{k=0}^{K-1}\beta_k c_{k,l}\right)\right)^2 \leq \frac{\Lambda'^2}{\epsilon^2} = \frac{\left(\sum_{l=1}^{L}\left|w_l + \sum_{k=0}^{K-1}\beta_k c_{k,l}\right|\right)^2}{\epsilon^2} \quad (9)$$

where $\epsilon$ represents a predetermined precision. The number of measurements M' can be minimized by computing the minimum over of $\beta$ of $\Sigma_l |w_l + \Sigma_{k=0}^{K-1}\beta_k c_{k,l}|$. That is the system may compute the quantity given below in equation (10).

$$\beta^* = \operatorname*{argmin}_{\beta}\left(\sum_{l=0}^{L-1}\left|w_l + \sum_{k=0}^{K-1}\beta_k c_{k,l}\right|\right) \quad (10)$$

Computing a minimum number of measurements M' is described in more detail below with reference to FIG. 3.

In some implementations the constraints described above with reference to step 204 may include pure state constraints. A pure state constraint is defined as a constraint that can cause measured quantum states of the quantum system to map from a decohered quantum state to a nearest pure quantum state, e.g., where near is defined via a Hilbert Schmidt norm or other norm. Pure state constraints can be derived or identified using a variety of techniques. Example techniques for deriving pure state constraints are given in "*Pure-N-representability conditions of two-fermion reduced density matrices*," David A. Mazziotti, Phys. Rev. A 94, 032516.

Given one or more pure state constraints, the constraints may be applied in a variety of ways. For example, the system may perform an optimization to find the nearest 2-reduced density matrix (2-RDM) to a measured 2-RDM that satisfies the pure state constraints. That is the system may measure a density operator $\rho'$ describing the quantum state and can define $f(\rho')$ as an objective function that has value 0 when all the pure state constraints are satisfied so that for every violated constraint the objective function's energy is higher. The system may then minimize $f(\rho')$ to find a p that satisfies, or almost satisfies, all of the pure state constraints. This solution may represent a purification of the state $\rho'$.

In some cases this procedure may take an energy estimate further away from the correct energy. However, if the system performs this procedure as an inside loop of a quantum variational algorithm then the outer loop of the quantum variational algorithm may drive the system to a state $\rho'$ that projects to a pure state with an accurate energy.

The estimated observable can be used to simulate the quantum system. For example, as described above with reference to FIG. 1, the estimated observable may be used to determine properties of the quantum system. For example, an estimated energy expectation value may be used to determine the conductivity of a metal.

In some implementations the process 200 may be used to estimate other properties or simulation metrics of a quantum system. For example, the process may be used to reduce Trotter errors (that are related to the norm of a Hamiltonian.)

Figure 3:
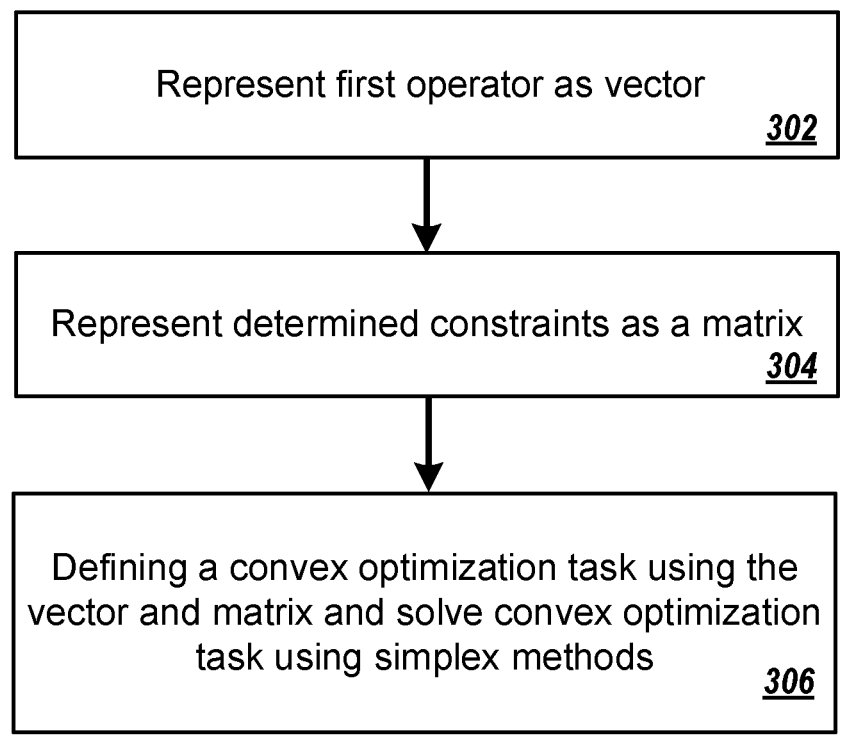
FIG. 3 is a flow diagram of an example process for minimizing a number of measurements required to determine an expectation value of an observable.

FIG. 3 is a flow diagram of an example process for minimizing a number of measurements required to determine an expectation value of an observable. For convenience, the process 300 will be described as being performed by a system of one or more classical or quantum computing devices located in one or more locations. For example, a quantum computation system, e.g., the system 100 of FIG. 1, appropriately programmed in accordance with this specification, can perform the process 300.

The system represents the first operator described above with reference to step 202 of FIG. 2 as a vector $v_H$ (step 302). Each element of the vector $v_H$ may correspond to a different fermionic operator, i.e., combinations of fermionic annihilation or creation operators $\alpha_p^\dagger$ and $\alpha_q$. For example, the system may map the fermionic operator $\alpha_p^\dagger \alpha_q$ to a vector element $1+N+p+qN$ and map the fermionic operator $\alpha_p^\dagger \alpha_q^\dagger \alpha_r \alpha_s$ to a vector element $1+N+N^2+p+qN+rN^2+sN^3$, where the entries of the vector correspond to the coefficients of the term. In other words, the coefficients of the Hamiltonian terms can be represented in vector form. Since there are $N^2$ terms that correspond to fermionic operators $\alpha_p^\dagger \alpha_q$, then the first $N^2$ entries of the vector include the coefficients of the $\alpha_p^\dagger \alpha_q$ terms. Then, the remaining $N^4$ entries of the vector would include the coefficients of the $\alpha_p^\dagger \alpha_q^\dagger \alpha_r \alpha_s$ terms.

The system represents the constraints determined above with reference to step 204 of FIG. 2 as a matrix C of dimension K×L (step 304). Each constraint $C_k$ represents a row of the matrix C, with each row being represented as a vector using the same techniques described with reference to step 302. In some implementations the system may add a constraint that corresponds to $\mathbb{I}=0$ in order to provide a mechanism for cancelling out the identity term.

The system defines a convex optimization task using the vector $v_H$ and the matrix C (step 306). For example, the system may express the task of computing the quantity given above in equation (10) as a convex $L_1$ minimization task given by equation (11) below.

$$\beta^* = \operatorname*{argmin}_{\beta}(\|v_H - C^T\beta\|_1) \quad (11)$$

In equation (11), $\beta$ epresents a vector of dimension K.

To determine an optimal or near optimal vector $\beta^*$, which in turn may be used to determine an optimal or near optimal number of measurements M required to estimate the expectation value of the observable associated with the first observable, the system may apply simplex methods. For example, the system may represent the $L_1$ minimization task as the linear program minimize $\mathbb{I}^\dagger q$ subject to $-q \leq v_H - C^T\beta \leq q$, where q represents an auxiliary variable. Applications of the processes described in FIGS. 2 and 3 are illustrated below with reference to FIG. 4.

Figure 4:
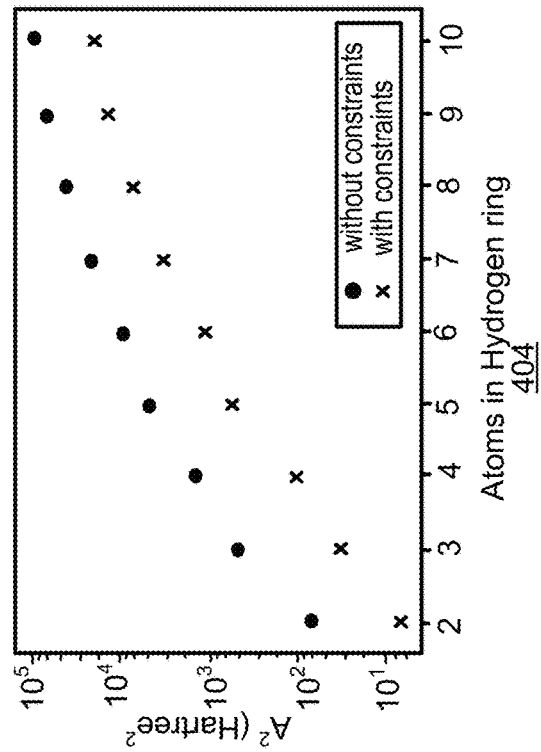
FIG. 4 depicts a series of example plots that compare values of the number of measurements required to estimate expected values of quantum mechanical observables.
Figure 4:
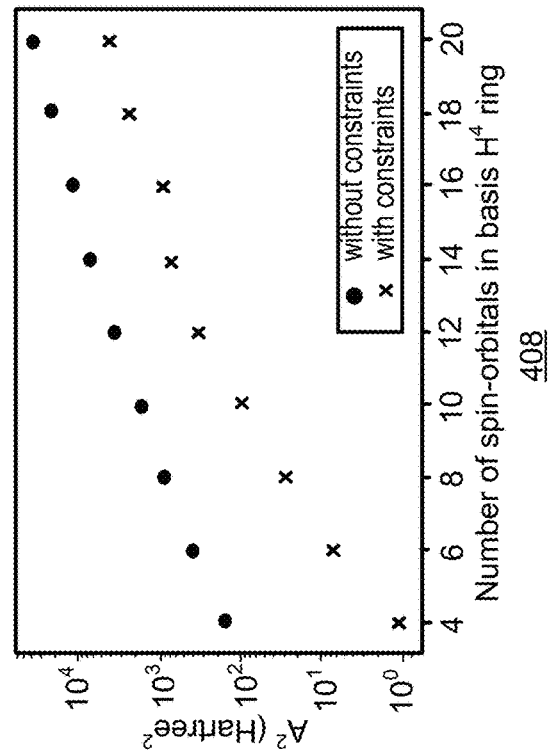
Figure 4:
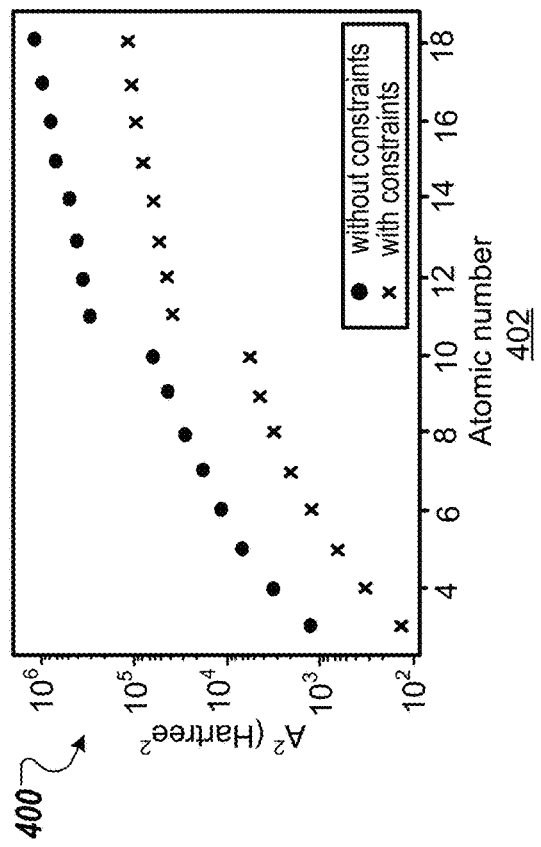
Figure 4:
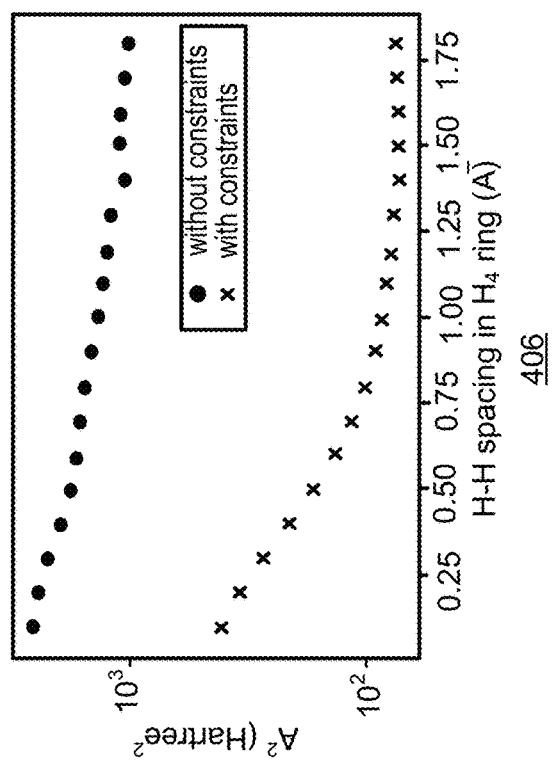

FIG. 4 depicts a series of example plots 402, 404, 406 and 408 that compare values of an upper bound of the number of measurements required to estimate expected values of quantum mechanical observables (e.g., as defined above in equation (3)) using the techniques described in this specification, e.g., processes 200 and 300 of FIGS. 2 and 3, and without using the techniques described in this specification. More specifically the example plots show values of $\Lambda$ and $\Lambda'$ as defined in equations (4) and (9) above. In each of the plots 402-408, circles represent the value of $\Lambda^2$ prior to applying the techniques described in this specification. The crosses represent the value of $\Lambda'^2$ after applying the techniques described in this specification.

Plot 402 compares values of the number of measurements required to estimate expected values of quantum mechanical observables for different chemical elements using the techniques described in this specification and without using the techniques described in this specification. The x-axis of plot 402 represents atomic number. The y-axis of plot 402 represents $\Lambda^2$. Plot 402 shows that applying the techniques described in this specification provides an improvement of about one order of magnitude with a jump in values between the second and third rows of the periodic table.

Plot 404 compares values of the number of measurements required to estimate expected values of quantum mechanical observables for a progression of hydrogen rings in the minimal basis of increased size where the distance between adjacent hydrogens is fixed at the $H_2$ bond length of 0.7414 Å. The x-axis of plot 404 represents number of atoms in the hydrogen ring. The y-axis of plot 402 represents $\Lambda^2$. Plot 404 shows that applying the techniques described in this specification provides an improvement in the number of measurements required to estimate expected values of quantum mechanical observables.

Plot 406 shows how geometry effects the techniques described in this specification and plots a square $H_4$ ring in the minimal basis as the spacing between hydrogens in the square is changed from 0.1 Å to 1.8 Å. The x-axis of plot 406 represents H-H spacing in $H_4$ ring (A). The y-axis of plot 402 represents $\Lambda^2$. Plot 406 shows that applying the techniques described in this specification provides an improvement in the number of measurements required to estimate expected values of quantum mechanical observables.

Plot 408 shows how the techniques described in this specification are effected as the active space of a $H_4$ ring with atom spacing of 0.7414 Å is increased from four spin-orbitals to twenty spin-orbitals with calculations performed in a double zeta (cc-pVDZ) basis. The x-axis of plot 406 represents the number of spin-orbitals in the basis for $H_4$ ring. The y-axis of plot 402 represents $\Lambda^2$. Plot 408 shows that applying the techniques described in this specification provides an improvement in the number of measurements required to estimate expected values of quantum mechanical observables.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof .

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by a quantum computing device, the method comprising:
receiving, from a classical processor, data specifying an initial quantum state and a combination of operators that represents a quantum mechanical observable of a physical system, the quantum mechanical observable of the physical system comprising a Hamiltonian that describes dynamics of the physical system, wherein
the combination of operators is generated through application of one or more constraints on expectation values of terms of the quantum mechanical observable to an expectation value of the quantum mechanical observable, wherein application of the one or more constraints on expectation values of terms of the quantum mechanical observable to the expectation value of the quantum mechanical observable replaces an expectation value of at least one term in the quantum mechanical observable with an expectation value of a different term in the quantum mechanical observable, the expectation value of the different term containing different operators and different weights than the expectation value of the at least one term; and
the combination of operators has a same expectation value as the quantum mechanical observable;
preparing independent copies of the initial quantum state;
performing measurements of the combination of operators on the independent copies of the initial quantum state; and
transmitting, to the classical processor, data representing results of the measurements of the combination of operators for estimation of an expectation value of the quantum mechanical observable.

2. The method of claim 1, wherein the constraints on expectation values of terms of the quantum mechanical observable are determined using interactions between particles included in the physical system.

3. The method of claim 1, wherein one or more of the constraints on expectation values of terms of the quantum mechanical observable comprise an energy conservation constant.

4. The method of claim 1, wherein one or more of the constraints on expectation values of terms of the quantum mechanical observable comprise a momentum conservation constant.

5. The method of claim 1, wherein the Hamiltonian comprises a weighted linear combination of qubit operators.

6. The method of claim 1, wherein an expectation value of each of the constraints is equal to zero.

7. The method of claim 1, wherein the combination of operators comprises the quantum mechanical observable and a weighted linear combination of the constraints on expectation values of terms of the quantum mechanical observable.

8. The method of claim 1, wherein performing measurements of the combination of operators on the independent copies of the initial quantum state comprises measuring diagonal terms of the combination of operators in parallel.

9. The method of claim 1, wherein the constraints comprise one or more of (i) equality constraints or (ii) inequality constraints.

10. The method of claim 1, wherein the constraints comprise pure state constraints, wherein pure state constraints comprise constraints that cause measured quantum states of a quantum system to map from a decohered quantum state to a nearest pure quantum state.

11. The method of claim 1, wherein the combination of operators is Hermitian.

12. A quantum computing device comprising:
a physical system comprising a plurality of qubits;
one or more control devices configured to operate the physical system, the one or more control devices comprising one or more measurement devices configured to perform measurements of operators of the physical system and send respective measurement results to a classical processor;
wherein the quantum computing device is configured to perform operations comprising:
receiving, from a classical processor, data specifying an initial quantum state and a combination of operators that represents a quantum mechanical observable of a physical system, the quantum mechanical observable of the physical system comprising a Hamiltonian that describes dynamics of the physical system, wherein
the combination of operators is generated through application of one or more constraints on expectation values of terms of the quantum mechanical observable to an expectation value of the quantum mechanical observable, wherein application of the one or more constraints on expectation values of terms of the quantum mechanical observable to the expectation value of the quantum mechanical observable replaces an expectation value of at least one term in the quantum mechanical observable with an expectation value of a different term in the quantum mechanical observable, the expectation value of the different term containing different operators and different weights than the expectation value of the at least one term; and
the combination of operators has a same expectation value as the quantum mechanical observable;
preparing independent copies of the initial quantum state;
performing measurements of the combination of operators on the independent copies of the initial quantum state; and
transmitting, to the classical processor, data representing results of the measurements of the combination of operators for estimation of an expectation value of the quantum mechanical observable.

13. The quantum computing device of claim 12, wherein the constraints on expectation values of terms of the quantum mechanical observable are determined using interactions between particles included in the physical system.

14. The quantum computing device of claim 12, wherein one or more of the constraints on expectation values of terms of the quantum mechanical observable comprise an energy conservation constant.

15. The quantum computing device of claim 12, wherein one or more of the constraints on expectation values of terms of the quantum mechanical observable comprise a momentum conservation constant.

16. The quantum computing device of claim 12, wherein the Hamiltonian comprises a weighted linear combination of qubit operators.

17. The quantum computing device of claim 12, wherein an expectation value of each of the constraints is equal to zero.

18. The quantum computing device of claim 12, wherein the combination of operators comprises the quantum mechanical observable and a weighted linear combination of the constraints on expectation values of terms of the quantum mechanical observable.

\* \* \* \* \*